United States Patent
Suda et al.

(10) Patent No.: US 6,817,540 B2
(45) Date of Patent: Nov. 16, 2004

(54) THERMOELEMENT

(75) Inventors: Hiroshi Suda, Tokyo (JP); Masahiro Aburakawa, Tokyo (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 10/473,409

(22) PCT Filed: Nov. 14, 2002

(86) PCT No.: PCT/JP02/11899

§ 371 (c)(1),
(2), (4) Date: Sep. 30, 2003

(87) PCT Pub. No.: WO03/064830

PCT Pub. Date: Aug. 7, 2003

(65) Prior Publication Data

US 2004/0112050 A1 Jun. 17, 2004

(30) Foreign Application Priority Data

Jan. 30, 2002 (JP) ........................................ 2002-021823

(51) Int. Cl.[7] ............................. G05D 23/12; F02G 5/00
(52) U.S. Cl. .................................... 236/99 K; 123/552
(58) Field of Search ............................. 236/99 K, 13, 236/34, 34.5, 101 C; 123/552

(56) References Cited

U.S. PATENT DOCUMENTS 5,775,270 A    7/1998   Huemer et al.

FOREIGN PATENT DOCUMENTS

| JP | 54153923 A | * 12/1979 | .......... F02D/33/02 |
| JP | 60-56877 | 4/1985 | |
| JP | 01315654 A | * 12/1989 | ............ F02M/1/10 |
| JP | 11-37340 | 2/1999 | |

* cited by examiner

Primary Examiner—Chen Wen Jiang
(74) Attorney, Agent, or Firm—Oblon, Spivak, McClelland, Maier & Neustadt, P.C.

(57) ABSTRACT

A thermo element that makes it possible to efficiently raise the temperature of a whole body of wax encapsulated in a case and to obtain a reliable seal structure for a terminal withdrawal portion used to control the electrification of a heating device. The thermo element includes a thermally expanding body encapsulated in a tube-type case, and which allows a moving piston to advance toward and withdraw from the outside of the case with a change in volume of the thermally expanding body that accompanies a variation in the temperature thereof, and a heating element disposed in the case and that thermally affects the thermally expanding body. An electrode member is disposed inside the heating element. Further, a plate spring member, which also serves as a heat radiation fin for radiating heat to the thermally expanding body, is disposed at the outer circumference of the heating element. The plate spring member has a larger surface area than the heating element.

18 Claims, 3 Drawing Sheets

THERMOELEMENT

TECHNICAL FIELD

The present invention relates to a thermo element suitable for use in an electronic control thermostat that performs control to vary the water temperature in an engine cooling water temperature control system that variably sets the cooling water temperature in accordance with the load of the internal combustion engine (called the 'engine' hereinafter) employed in an automobile or the like, for example.

BACKGROUND ART

Generally, a thermo element functions as an actuator that performs drive control of a thermostat valve or similar by causing a moving piston to advance toward and withdraw from the outside of a wax case in accordance with a change in the volume of thermo wax which is encapsulated in the case as a thermally expanding body. Further, as an example of a thermo element of this type, a thermo element is known which is constituted by providing, in or outside the case, heater means for performing control of the thermo wax temperature so as to permit control of the change in the volume of the thermo wax by means of heat which is generated by heater means.

As an example of a thermo element that comprises heater means of this type, a thermostat actuation member that comprises an electrical-resistance heating element, as illustrated by Japanese Patent Application Laid Open No. H8-222101, for example, is known. This conventional technology involves a wax-type thermal element structure in which an electrical-resistance heating element is disposed so as to be embedded in part of the wax encapsulated in the casing, and connecting wire material, which allows electricity to flow to the electrical-resistance heating element within the wax, is withdrawn in a hermetically sealed state via a harness withdrawal portion which is provided by encapsulating sealing material at an end of the casing.

However, in the case of the above-described conventional thermo element, because a resistive heating element is used as the heater means, not only is it difficult to set the heat generation temperature to a preset target temperature and to maintain and control this temperature, there have also been cases where a controller for performing control of the electrification of the resistive heating element must be provided outside the element and electrification control from the outside is necessary.

Furthermore, in the case of the above-described conventional thermo element, an element with a structure in which a heater made of metal foil is attached to a flat metal plate is employed as the electrical-resistance heating element and this element is simply embedded in the wax so as to face the wax. Because only the plate-shaped surface to which the metal foil of the metal plate is attached generates heat, although heat propagates to parts close to the heat-generating part of this surface, because the interval between the heat-generating part and the inner circumferential surface of the casing is not constant, the propagation of heat inside the casing is non-uniform, and the generation of a temperature variation was inevitable. There was therefore also the problem that it was difficult to efficiently raise the temperature of the whole of the wax encapsulated in the casing with this electrical-resistance heating element.

In addition, because two harnesses to which connecting wire material drawn from the heater means was soldered were withdrawn from a harness withdrawal portion that was formed by integrally molded sealing material, the sealing performance in this part was a problem and there was a risk of wax leaking to the outside as a result of the high pressures generated when the wax encapsulated in the casing expanded as a result of a rise in temperature.

The present invention was conceived in view of this matter, an object thereof being to provide a thermo element which not only permits the temperature of the whole of a thermally expanding body such as wax encapsulated in a case to be efficiently raised by means of heater means, and in which element the structure of a terminal withdrawal portion for controlling the electrification of the heater means from the outside is simple and affords a reliable sealing state, but which also allows control of the electrification of the heater means to be dispensed with.

DISCLOSURE OF THE INVENTION

In order to achieve this object, the thermo element according to the present invention (the invention according to claim 1) is a thermo element equipped with a thermally expanding body which is encapsulated in a tube-type case and which serves to allow a moving piston to advance toward and withdraw from the outside of the case in accordance with a change in the volume of the thermally expanding body that accompanies a variation in the temperature thereof, and a heating element which is disposed in the case and thermally affects the thermally expanding body, characterized in that the heating element has a substantially tubular shape and is disposed so as to be embedded in the thermally expanding body in a substantially central position in the case; an electrode member, which is connected to an external power supply via a terminal withdrawal portion provided at the end of the case on the opposite side to the piston, is disposed on the inner circumferential side of the heating element; a plate spring member which also serves as a heat radiation fin for radiating heat to the thermally expanding body is disposed at the circumference of the heating element between this circumference and the inside wall portion of the case, the plate spring member having a larger surface area than the heating element.

The thermo element according to the present invention (the invention according to claim 2) is the thermo element according to claim 1, characterized in that the terminal withdrawal portion comprises: an insulating tube body which is held at an end of the case in a state where sealing material is interposed between the insulating tube body and the end of the case; and a terminal which is arranged penetratingly within the insulating tube body in a state where sealing material is interposed between the terminal and the insulating tube body, the terminal being electrically connected to an electrode member which is provided in the heating element.

The thermo element according to the present invention (the invention according to claim 3) is the thermo element according to claim 1 or 2, characterized in that the plate spring member consists of an electrically conductive material and functions as a second terminal that permits electrical conduction between the heating element and the case by contacting the outer circumference of the heating element and the inside wall portion of the case.

The thermo element according to the present invention (the invention according to claim 4) is the thermo element according to any one of claims 1 to 3, characterized in that the electrode member comprises an electrically conductive plate spring member; and spring elements that cause a pressure contact force to act on the inner circumference of the heating element are provided on the electrode member.

The thermo element according to the present invention (the invention according to claim 5) is the thermo element according to claim 1, characterized in that the terminal withdrawal portion comprises: an insulating tube body which is held at an end of the case in a state where sealing material is interposed between the insulating tube body and the end of the case; and first and second terminals which are arranged penetratingly within the insulating tube body in a state in which sealing material is interposed between each of these terminals and the insulating tube body, the first terminal being electrically connected to an electrode member which is disposed on the inner circumferential side of the heating element, and the second terminal being electrically connected to at least either the plate spring member disposed on the outer circumferential side of the heating element or the outer circumferential side of the heating element.

The thermo element according to the present invention (the invention according to claim 6) is the thermo element according to claim 5, characterized in that insulating material is attached to that part of the plate spring member which makes contact with the inside wall portion of the case, this insulating material providing insulation between the plate spring member and the case.

The thermo element according to the present invention (the invention according to claim 7) is the thermo element according to any one of claims 1 to 6, characterized in that the heating element is constituted as a PTC thermistor equipped with a self-acting temperature control function.

The thermo element according to the present invention (the invention according to claim 8) is a thermo element equipped with a thermally expanding body which is encapsulated in a tube-type case and which serves to allow a moving piston to advance toward and withdraw from the outside of the case in accordance with a change in the volume of the thermally expanding body that accompanies a variation in the temperature thereof, and a heating element which is disposed in the case and thermally affects the thermally expanding body, characterized in that the heating element is substantially plate-shaped and is disposed so as to be embedded in the thermally expanding body in a substantially central position in the case; an electrode member, which is connected to an external power supply via a terminal withdrawal portion provided at the end of the case on the opposite side to the piston, is disposed on one side of the plate-shaped surface of the heating element; a plate spring member which also serves as a heat radiation fin for radiating heat to the thermally expanding body is disposed on the other side of the plate-shaped surface of the heating element between same and the inside wall portion of the case, the plate spring member having a larger surface area than the heating element.

The thermo element according to the present invention (the invention according to claim 9) is the thermo element according to claim 8, characterized in that the terminal withdrawal portion comprises: an insulating tube body which is held at an end of the case in a state where sealing material is interposed between the insulating tube body and the end of the case; and a terminal which is arranged penetratingly within the insulating tube body in a state where sealing material is interposed between the terminal and the insulating tube body, the terminal being electrically connected to an electrode member which is provided on one side of the plate-shaped surface of the heating element.

The thermo element according to the present invention (the invention according to claim 10) is the thermo element according to claim 8 or 9, characterized in that the plate spring member consists of an electrically conductive material and functions as a second terminal that causes electrical conduction between the other side of the plate-shaped surface of the heating element and the inside wall portion of the case by contacting the other side of the plate-shaped surface of the heating element and the inside wall portion of the case.

The thermo element according to the present invention (the invention according to claim 11) is the thermo element according to any one of claims 8 to 10, characterized in that a second plate spring member which comprises a heat radiation fin for radiating heat to the thermally expanding body is disposed between the electrode member which is disposed on one side of the plate-shaped surface of the heating element and the inside wall portion of the case; and insulating material is attached to that part of the second plate spring member which contacts the side of the electrode member or the inside wall portion of the case.

The thermo element according to the present invention (the invention according to claim 12) is the thermo element according to any one of claims 8 to 11, characterized in that the plate-shaped heating element is disposed in a position that is shifted from a central position in the case in a direction orthgonal to the plate-shaped surface; and an electrode member is disposed on the side of the heating element which is close to the inside wall portion of the case, and the plate spring member is disposed on the opposite side of the heating element.

The thermo element according to the present invention (the invention according to claim 13) is the thermo element according to any one of claims 8 to 12, characterized in that the electrode member comprises an electrically conductive plate spring member; and spring elements that cause a pressure contact force to act on the inner circumference of the heating element are provided on the electrode member.

The thermo element according to the present invention (the invention according to claim 14) is the thermo element according to claim 8, characterized in that the terminal withdrawal portion comprises: an insulating tube body which is held at an end of the case in a state where sealing material is interposed between the insulating tube body and the end of the case; and first and second terminals which are arranged penetratingly within the insulating tube body in a state in which sealing material is interposed between each of these terminals and the insulating tube body, the first terminal being electrically connected to an electrode member which is provided on one side of the plate-shaped surface of the heating element, and the second terminal being electrically connected to either the plate spring member or the other side of the plate-shaped surface of the heating element.

The thermo element according to the present invention (the invention according to claim 15) is the thermo element according to claim 14, characterized in that insulating material is attached to that part of the plate spring member which makes contact with the case, this insulating material providing insulation between the plate spring member and the case.

The thermo element according to the present invention (the invention according to claim 16) is the thermo element according to claim 8, characterized in that: a second electrode member is disposed so as to be interposed between the other side of the plate-shaped surface of the plate-shaped heating element and the plate spring member; and the terminal withdrawal portion comprises: an insulating tube body which is held at an end of the case in a state where sealing material is interposed between the insulating tube body and the end of the case; and first and second terminals which are arranged penetratingly within the insulating tube body in a state in which sealing material is interposed between each of these terminals and the insulating tube body, the first terminal being electrically connected to an electrode member which is provided on one side of the heating element, and the second terminal being electrically connected to the second electrode member.

The thermo element according to the present invention (the invention according to claim 17) is the thermo element according to claim 16, characterized in that insulating material is attached to that part of the plate spring member which makes contact with the inside wall portion of the case, this insulating material providing insulation between the plate spring member and the inside wall portion of the case.

The thermo element according to the present invention (the invention according to claim 18) is the thermo element according to any one of claims 8 to 17, characterized in that the heating element is constituted as a PTC thermistor equipped with a self-acting temperature control function.

According to the present invention, because a tubular or plate-shaped heating element (which may be a resistive heating element or a PTC thermistor) which is embedded in the thermally expanding body in the case is held by a plate spring member that serves as both a heat radiation fin and an electrode, the heat generated by the heating element can be efficiently and rapidly transmitted to the thermally expanding body. Therefore, when the thermo element is employed in the water temperature variable control of an electronically controlled thermostat, for example, the desired thermo element effects can be exhibited.

Further, according to the present invention, when a cylindrical heating element is used, because the surface area of the element itself is then large, the transmission of heat to the thermally expanding body can be executed even more rapidly and reliably.

In addition, in the case of a bipolar-type structure, by attaching insulating material to that part of the plate spring member that contacts the inside wall portion of the case, an insulation effect between the plate spring member and the case can be ensured, and by allowing the outside of the plate spring member to contact the case, it is possible to prevent damage resulting from pressurization during the thermal expansion of the thermally expanding body.

Furthermore, according to the present invention, because the heating element is held within the case as a result of being held between the electrode member and the plate spring member, even if the heating element is a PTC thermistor consisting of a ceramic material, damage such as cracking does not occur and reliability and durability are improved.

Moreover, according to the present invention, in the case of a monopolar structure, the overall structure is simplified because withdrawal is via the electrode member provided in the center of the case, and then the terminal withdrawal portion at the end of the case, and the terminal, while the plate spring member serves as a terminal such that electrification takes place via the case. Further, in so doing, a space for providing adequate sealing material can be secured in the terminal withdrawal portion, whereby reliability with respect to leakage and so forth of the thermally expanding body is improved.

Moreover, according to the present invention, by using a PTC thermistor as the heating element and providing same with a self-acting temperature control function, electrification control by an external controller is rendered unnecessary and it is possible to obtain a thermo element with the desired operational performance.

BRIEF DESCRIPTION OF THE DRAWINGS

FIG. 1 shows a first embodiment of the thermo element according to the present invention, wherein FIG. 1(a) is a vertical cross-sectional view of the thermo element and FIG. 1(b) is a cross-sectional view thereof along the line I—I;

FIG. 3 shows a second embodiment of the thermo element according to the present invention, wherein FIG. 3(a) is a vertical cross-sectional view of the thermo element and FIG. 3(b) is a cross-sectional view thereof along the line III—III.

BEST MODE FOR CARRYING OUT THE INVENTION

Figure 1:
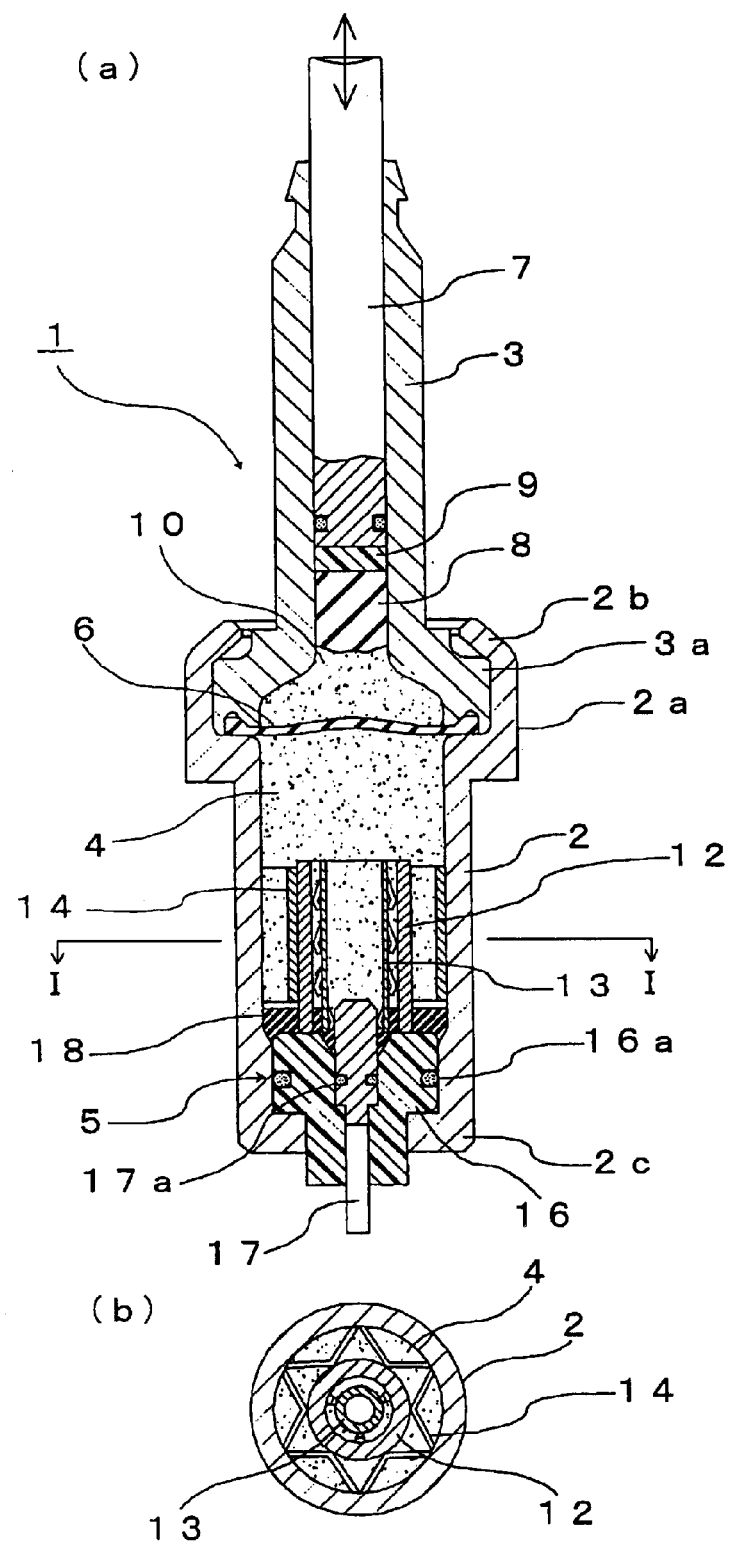
Figure 2:
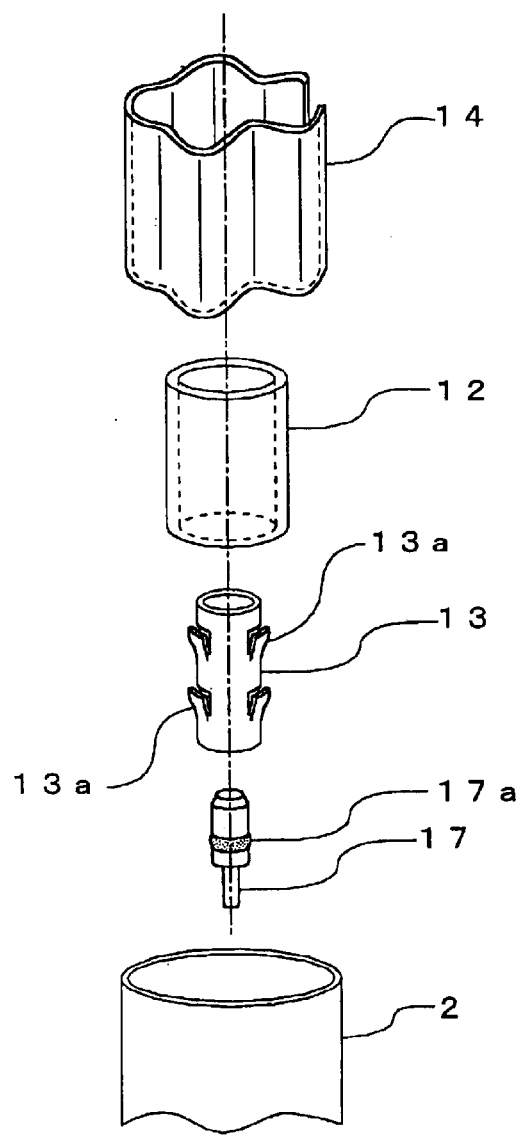
FIG. 2 is an outline perspective view in which internal principal parts of the thermo element shown in FIG. 1 are shown disassembled.

FIGS. 1 and 2 show the first embodiment of the thermo element according to the present invention. In these figures, the thermo element, which is denoted overall by the reference numeral 1, comprises a case main body 2 that has a substantially cylindrical shape, and a guide tube body 3 which is linked thereto by means of a caulking portion such that an inner end 3a of this body 3 is fitted within a large diameter section 2a provided at one end of the case main body 2.

4 is wax which is a thermally expanding body (consisting of a thermally expansive material) consisting of a mixture of paraffin and copper powder and which thermally expands and contracts in accordance with a temperature variation. This wax 4 is encapsulated in the case main body 2 such that the lower end of this wax 4 is encapsulated by means of a terminal withdrawal portion 5 (described subsequently) and the upper end is encapsulated by a diaphraphm 6 consisting of nitrile rubber or similar.

The diaphraphm 6 is provided so as be interposed between an inner circumference-side step portion of the large diameter section 2a of the case main body 2, and the inner end 3a of the guide tube body 3. Further, in the drawings, 7 is a moving piston which is held slidably by the guide tube body 3 and which advances toward and withdraws from the outside of the case as a result of the expansion and contraction of the wax 4, and 8 is a rubber piston consisting of nitrile rubber or similar which is disposed at the inner end of the moving piston 7 with a backup plate 9 made of polytetrafluoroethylene (P.T.F.E.) or the like interposed between this piston 8 and the inner end of the moving piston 7. The moving piston 7 is actuated as a result of the thermal expansion and contraction of the wax 4 which is caused by a liquid substance 10 constituting pressure transmission means which is included between the rubber piston 8 and diaphraphm 6 being transmitted to the rubber piston 8.

Here, the moving piston 7 is held in a position in which same is pulled in toward the guide tube body 3 shown in the drawings by a return force provided by a return spring or similar (not shown), and moves in the axial direction when the wax 4 thermally expands so as to then protude from the guide tube body 3.

12 is a heating element which has a substantially tubular shape, and which, as may be seen from FIGS. 1 and 2, is provided in an embedded state in the wax 4 in a substantially central position in the case main body 2. An electrode member 13, which is connected via the terminal withdrawal portion 5 provided at the end 2c of the case main body 2 on the opposite side to the piston to an external power supply (not shown), is disposed on the inner circumferential side of the heating element 12. Further, a plate spring member 14 which also serves as a heat radiation fin for radiating heat to the wax 4 is disposed at the circumference of the heating element 12 between the heating element 12 and the inside wall portion of the case main body 2. As shown in FIG. 2, the plate spring member 14 has a form which is produced by bending a plate spring with a wave-like shape into a tubular shape and has a surface area which is greater than that of the heating element 12.

Here, in this embodiment, a heating element equipped with a self-acting temperature control function, such as a PTC (Positive Temperature Coefficient) thermistor, for example, is used as the heating element 12. This PTC thermistor comprises a heating element with a positive resistance temperature coefficient which generates heat as a result of being electrified, and possesses the characteristic that a temperature increase and an increase in the resistance value brings about activation of the self-acting temperature control function and in turn the alleviation of the heat generation temperature. The operation of the thermo element can be controlled to the desired state in accordance with a variety of conditions by variably controlling the thermal expansion and contraction of the thermo wax at the desired state by means of this PTC thermistor.

The electrode member 13 is formed by an electrically conductive plate spring so as to have a tubular shape overall as shown in FIG. 2, and spring elements 13a that cause a pressure contact force to act on the inner circumference of the heating element 12 are provided on the electrode member 13 so as to protrude at suitable positions therefrom.

The plate spring member 14 is consisting of an electrically conductive material and functions as a second terminal that permits electrical conduction between the heating element 12 and the case main body 2 as a result of the wave-like part of this plate spring member 14 contacting the outer circumference of the heating element 12 and the inside wall portion of the case main body 2.

The terminal withdrawal portion 5 comprises an insulating tube body 16 consisting of plastic material or similar which is held at the end of the case main body 2 in a state where sealing material 16a such as an O-ring is interposed between the insulating tube body 16 and the end of the case main body 2, and comprises a terminal (first terminal) 17 which is also disposed penetratingly in the insulating tube body 16 in a state where sealing material 17a such as an O-ring is interposed between the terminal 17 and the insulating tube body 16, this terminal 17 being electrically connected to the electrode member 13 provided in the heating element 12.

Further, 18 is sealing material that is made to fill the case main body 2 in order to hermetically seal the inner end part of the terminal withdrawal portion 5, and thus the sealed state of the terminal withdrawal portion 5 is secured by this sealing material 16a, 17a, and 18.

According to the thermo element 1 with the above constitution, because the tubular heating element 12 embedded in the wax 4 within the case main body 2 is held so as to be aligned in the desired state by the plate spring member 14 which serves as both a heat radiation fin and an electrode, the heat generated by the heating element 12 can be efficiently and rapidly transmitted to the wax 4. This is because the wave-like part of the plate spring member 14 acts as a heat radiation fin and also has a large surface area.

Further, because the heating element 12 has a cylindrical shape and the surface area itself is then large, the transmission of heat to the wax 4 is even faster and more reliable.

Further, because the heating element 12 is held so as to be elastically held from both sides by the electrode member 13 and the plate spring member 14, even in the event that the heating element 12 is a PTC thermistor consisting of a ceramic material, damage such as cracking does not occur and reliability in terms of quality is improved along with durability.

In addition, in the case of a monopolar-type structure as per the above-described embodiment, the structure is one in which withdrawal is via the electrode member 13 provided in the center of the case main body 2, and then the terminal withdrawal portion 5 at the end of the case main body 2 and the first terminal 17, while the plate spring member 14 serves as a second terminal such that electrification takes place via the case main body 2. As a result, the electrification path to the heating element 12 is simple and the overall structure can be simplified.

Although a case of a monopolar-type structure in which one (the second) terminal serves as a body earth is described here in the above embodiment shown in FIGS. 1 and 2, other structures are possible. The terminal withdrawal portion 5 could also be a bipolar-type structure.

In such a case, the terminal withdrawal portion 5 may be constituted by an insulating tube body which is held at the case end in a state where sealing material is interposed between the insulating tube body and the case end, and by first and second terminals which are arranged penetratingly within the insulating tube body in a state in which sealing material is interposed between each of these terminals and the insulating tube body, and may be constituted such that the first terminal is electrically connected to the electrode member 13 provided in the heating element 12 and the second terminal is electrically connected to part of the plate spring member 14.

Further, insulating material must be attached to that part of the plate spring member 14 which makes contact with the inside wall portion of the case main body 2, this insulating material providing insulation between the plate spring member 14 and the case main body 2. Naturally, the outside of the plate spring member 14 could also be made to contact the inside wall portion of the case main body 2 here. This is effective on account of preventing damage to the plate spring member 14 and heating element 12 resulting from pressurization when the wax 4 thermally expands.

Figure 3:
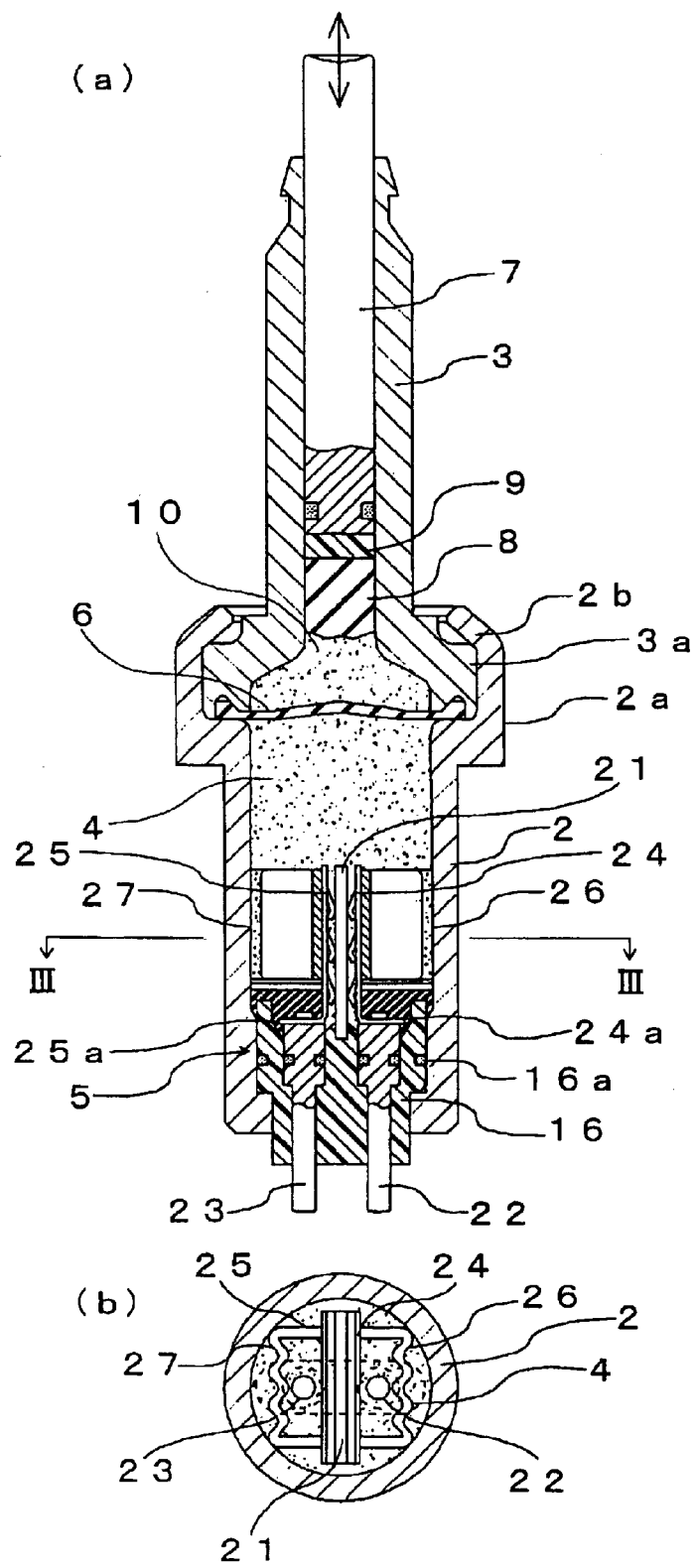

FIG. 3 shows the second embodiment of the present invention. In this embodiment, a heating element 21 is a plate-shaped and the terminal withdrawal portion 5 holds first and second terminals 22 and 23 penetratingly such that same are juxtaposed within an insulating tube body 17. Further, in FIG. 3, the same numbers have been assigned to parts which are the same as or equivalent to parts in FIGS. 1 and 2, and hence a detailed description is omitted here.

In this embodiment, the plate-shaped heating element 21 is disposed substantially in the center of the case main body 2 and electrode members 24 and 25 that form a pair are arranged on both sides of the plate-shaped surface of this element 21, wave-like plate spring members 26 and 27 being arranged on the outside between the electrode members 24 and 25 and the inside wall portion of the case main body 2. Here, the first electrode member 24 and the second plate spring member 26 are arranged on one side of the plate-shaped surface of the heating element 21 and are connected to the first terminal 22. Further, the second electrode member 25 and the first plate spring member 27 are connected on the other side of the plate-shaped surface and are connected to the second terminal 23.

The electrode members 24 and 25 are substantially in the form of a flat plate which is the same size as the heating element 21 and the inner surfaces of these members are suitably provided with plate spring elements, whereby the plate-shaped heating element 21 is held sandwiched from both sides. Further, connecting elements 24a and 25a which are connected by means of riveting or welding to the inner ends of the terminals 22 and 23 are formed at the respective ends of these electrode members 24 and 25 on the terminal withdrawal portion 5 side such that electrical conduction takes place via these parts.

With this constitution also, as per the embodiment described above, because the plate-shaped heating element 21 which is embedded in the wax 4 in the case main body 2 is elastically held by the electrode members 24 and 25 and the plate spring members 26 and 27 which also serv as heat radiation fins, the heat generated by the heating element 21 can be efficiently and rapidly transmitted to the wax 4.

Further, in the case of this bipolar-type structure, by attaching insulating material to the respective parts of the plate spring members 26 and 27 which contact the inside wall portion of the case main body 2, insulation can be ensured between the plate spring members 26 and 27 and the case main body 2, and, by allowing the outer part of the plate spring members 26 and 27 to contact the case, it is possible to prevent damage resulting from pressurization during the thermal expansion of the wax 4. However, other configurations are possible, and a gap could also be provided between the outside of the plate spring members 26 and 27 and the case main body 2. At such time, the heating element 21 is held only elastically by the electrode members 24 and 25.

Here, in the above-described embodiment, an example was described in which a plate-shaped heating element 21 is disposed substantially in the center of the case main body 2 and the electrode members 24 and 25 and plate spring members 26 and 27 are provided on both sides of the heating element 21. However, other configurations are also possible.

Figure 4:
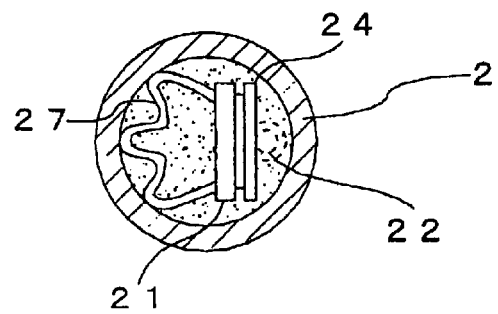
FIG. 4 is an outline cross-sectional view of principal parts which shows a modified example of the present invention.

For example, as shown in FIG. 4, a modified example may be considered such as one in which the plate-shaped heating element 21 is positioned so as to be shifted in any one direction which is orthogonal to the plate-shaped surface within the case main body 2, and in which the electrode member 24 is disposed on one side of the plate-shaped surface while the plate spring member 27 is disposed on the other.

Further, either electrode member may be omitted and the plate spring member may be constituted to directly hold the heating element 21. At such time, the plate spring member must be disposed in a state of contact between the heating element 21 and the inside wall portion of the case main body 2. Further, in the case of a bipolar-type structure, part of the plate spring member may be connected to the terminal 22 or 23.

On the other hand, in the case of a monopolar-type structure involving a body earth or similar, the plate spring member may make contact on both sides without the interposition of insulating material. It goes without saying that, here, as shown in FIG. 1, the terminal withdrawal portion 5 has a structure in which only one terminal is held penetratingly.

Further, it goes without saying that the present invention is not limited to or by the structure described in the above embodiment, and that the shape and structure and so forth of each part can be suitably modified and changed. A variety of modified examples may be considered for the structure of the pressure transmission section whereby the moving piston 7 is actuated by the thermal expansion of the wax 4, and for the shape and structure of the terminal withdrawal portion 5 or the seal structure thereof, and so forth, for example.

Further, the thermo element 1 according to the present invention is effective when used in a case where same is disposed in the cooling water system of an internal combustion engine or similar, and the temperature of the cooling water changes and the temperature of a thermally expanding body is changed in accordance with various control information such as the travel state of the vehicle, for example. However, usage is naturally not limited to such an application, this being a thermo element that actuates a moving piston by utilizing the thermal expansion and contraction of a thermally expanding body and may be applied to a device or apparatus which contains a heating element and in which the movement of the piston must be controlled by suitably controlling the electrification of this heating element.

[Effect of the Invention]

According to the thermo element of the present invention as described hereinabove, because a tubular or plate-shaped heating element (which may be a resistive heating element or a PTC thermistor) which is embedded in a thermally expanding body in a tube-type case is held by a plate spring member that serves as both a heat radiation fin and an electrode, the heat generated by the heating element can be efficiently and rapidly transmitted to the thermally expanding body. Therefore, when the thermo element is employed in the water temperature variable control of an electronically controlled thermostat, for example, the desired thermo element effects can be exhibited.

Further, according to the present invention, when a cylindrical heating element is used, because the surface area of the element itself is then large, the transmission of heat to the thermally expanding body can be executed even more rapidly and reliably. In addition, in the case of a bipolar-type structure, by attaching insulating material to that part of the plate spring member that contacts the inside wall portion of the case, an insulation effect between the plate spring member and the case can be ensured, and by allowing the outside of the plate spring member to contact the case, it is possible to prevent damage resulting from pressurization during the thermal expansion of the thermally expanding body.

Furthermore, according to the present invention, because the heating element is held within the case as a result of being held between the electrode member and the plate spring member, even if the heating element is a PTC thermistor consisting of a ceramic material, damage such as cracking does not occur and reliability and durability are improved.

Moreover, according to the present invention, in the case of a monopolar structure, the overall structure is simplified because withdrawal is via the electrode member provided in the center of the case, and then the terminal withdrawal portion at the end of the case, and the terminal, while the plate spring member serves as a terminal such that electrification takes place via the case. Further, in so doing, a space in which adequate sealing material is provided can be secured in the terminal withdrawal portion, whereby reliability with respect to leakage and so forth of the thermally expanding body is improved.

In addition, according to the present invention, because the plate-shaped heating element is positioned so as to be shifted in any direction orthogonal to the plate-shaped surface thereof within the case main body, and the plate spring member is disposed on the other side, it is possible to establish a state in which the heating element and the plate spring member which functions as heat transmitting means for the heating element are arranged with a good balance over the whole area within the case. Consequently, even in the case of a monopolar structure, the temperature of the whole of the wax encapsulated in the case can be efficiently raised.

Moreover, according to the present invention, by using a PTC thermistor as the heating element and providing same with a self-acting temperature control function, electrification control by an external controller is rendered unnecessary and it is possible to obtain a thermo element with the desired operational performance.

What is claimed is:

1. A thermo element equipped with a thermally expanding body which is encapsulated in a tube-type case and which serves to allow a moving piston to advance toward and withdraw from the outside of the case in accordance with a change in the volume of the thermally expanding body that accompanies a variation in the temperature thereof, and a heating element which is disposed in the case and thermally affects the thermally expanding body, characterized in that the heating element has a substantially tubular shape and is disposed so as to be embedded in the thermally expanding body in a substantially central position in the case;

an electrode member, which is connected to an external power supply via a terminal withdrawal portion provided at the end of the case on the opposite side to the piston, is disposed on the inner circumferential side of the heating element;

a plate spring member which also serves as a heat radiation fin for radiating heat to the thermally expanding body is disposed at the circumference of the heating element between this circumference and the inside wall portion of the case, the plate spring member having a larger surface area than the heating element.

2. The thermo element according to claim 1, characterized in that the terminal withdrawal portion comprises:

an insulating tube body which is held at an end of the case in a state with sealing material interposed between the insulating tube body and the end of the case; and a terminal which is arranged penetratingly within the insulating tube body in a state where sealing material is interposed between the terminal and the insulating tube body, the terminal being electrically connected to the electrode member which is provided in the heating element.

3. The thermo element according to claim 1, characterized in that the plate spring member consists of an electrically conductive material and functions as a second terminal that permits electrical conduction between the heating element and the case by contacting the outer circumference of the heating element and the inside wall portion of the case.

4. The thermo element according to claim 1, characterized in that the electrode member comprises an electrically conductive plate spring member; and spring elements that cause a pressure contact force to act on the inner circumference of the heating element are provided on the electrode member.

5. The thermo element according to claim 1, characterized in that the terminal withdrawal portion comprises:

an insulating tube body which is held at an end of the case with sealing material interposed between the insulating tube body and the end of the case; and first and second terminals which are arranged penetratingly within the insulating tube body with sealing material interposed between each of these terminals and the insulating tube body, the first terminal being electrically connected to an electrode member which is disposed on the inner circumferential side of the heating element, and the second terminal being electrically connected to at least either the plate spring member disposed on the outer circumferential side of the heating element or the outer circumferential side of the heating element.

6. The thermo element according to claim 5, characterized in that insulating material is attached to that part of the plate spring member which makes contact with the inside wall portion of the case, this insulating material providing insulation between the plate spring member and the case.

7. The thermo element according to claim 1, characterized in that the heating element is constituted as a PTC thermistor equipped with a self-acting temperature control function.

8. A thermo element equipped with a thermally expanding body which is encapsulated in a tube-type case and which serves to allow a moving piston to advance toward and withdraw from the outside of the case in accordance with a change in the volume of the thermally expanding body that accompanies a variation in the temperature thereof, and a heating element which is disposed in the case and thermally affects the thermally expanding body, characterized in that the heating element is substantially plate-shaped and is disposed so as to be embedded in the thermally expanding body in a substantially central position in the case;

an electrode member, which is connected to an external power supply via a terminal withdrawal portion provided at the end of the case on the opposite side to the piston, is disposed on one side of the plate-shaped surface of the heating element;

a plate spring member which also serves as a heat radiation fin for radiating heat to the thermally expanding body is disposed on the other side of the plate-shaped surface of the heating element between same and the inside wall portion of the case; and the plate spring member has a larger surface area than the heating element.

9. The thermo element according to claim 8, characterized in that the terminal withdrawal portion comprises:

an insulating tube body which is held at an end of the case with sealing material interposed between the insulating tube body and the end of the case; and a terminal which is arranged penetratingly within the insulating tube body with sealing material interposed between the terminal and the insulating tube body, the terminal being electrically connected to an electrode member which is provided on one side of the plate-shaped surface of the heating element.

10. The thermo element according to claim 8, characterized in that the plate spring member consists of an electrically conductive material and functions as a second terminal that causes electrical conduction between the other side of the plate-shaped surface of the heating element and the inside wall portion of the case by contacting the other side of the plate-shaped surface of the heating element and the inside wall portion of the case.

11. The thermo element according to claim 8,
characterized in that a second plate spring member which comprises a heat radiation fin for radiating heat to the thermally expanding body is disposed between the electrode member which is disposed on one side of the plate-shaped surface of the heating element and the inside wall portion of the case; and
insulating material is attached to that part of the second plate spring member which contacts the side of the electrode member or the inside wall portion of the case.

12. The thermo element according to claim 8,
characterized in that the plate-shaped heating element is disposed in a position that is shifted from a central position in the case in a direction orthogonal to the plate-shaped surface; and
an electrode member is disposed on the side of the heating element which is close to the inside wall portion of the case, and the plate spring member is disposed on the opposite side of the heating element.

13. The thermo element according to claim 8,
characterized in that the electrode member comprises an electrically conductive plate spring member; and
spring elements that cause a pressure contact force to act on the inner circumference of the heating element are provided on the electrode member.

14. The thermo element according to claim 8,
characterized in that the terminal withdrawal portion comprises:
an insulating tube body which is held at an end of the case where sealing material interposed between the insulating tube body and the end of the case; and
first and second terminals which are arranged penetratingly within the insulating tube body with sealing material interposed between each of these terminals and the insulating tube body,
the first terminal being electrically connected to an electrode member which is provided on one side of the plate-shaped surface of the heating element, and
the second terminal being electrically connected to either the plate spring member or the other side of the plate-shaped surface of the heating element.

15. The thermo element according to claim 14, characterized in that insulating material is attached to that part of the plate spring member which makes contact with the case, this insulating material providing insulation between the plate spring member and the case.

16. The thermo element according to claim 8, characterized in that:
a second electrode member is disposed so as to be interposed between the other side of the plate-shaped surface of the plate-shaped heating element and the plate spring member; and
the terminal withdrawal portion comprises:
an insulating tube body which is held at an end of the case with sealing material interposed between the insulating tube body and the end of the case; and
first and second terminals which are arranged penetratingly within the insulating tube body with sealing material interposed between each of these terminals and the insulating tube body,
the first terminal being electrically connected to an electrode member which is provided on one side of the heating element, and
the second terminal being electrically connected to the second electrode member.

17. The thermo element according to claim 16, characterized in that insulating material is attached to that part of the plate spring member which makes contact with the inside wall portion of the case, this insulating material providing insulation between the plate spring member and the inside wall portion of the case.

18. The thermo element according to claim 8, characterized in that the heating element is constituted as a PTC thermistor equipped with a self-acting temperature control function.

* * * * *